(12) United States Patent
Bodin et al.

(10) Patent No.: US 7,213,076 B2
(45) Date of Patent: May 1, 2007

(54) DYNAMIC INDICATION OF EMAIL CAPABILITIES

(75) Inventors: William Kress Bodin, Austin, TX (US); Derral Charles Thorson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 836 days.

(21) Appl. No.: 10/046,952

(22) Filed: Jan. 15, 2002

(65) Prior Publication Data

US 2003/0135561 A1 Jul. 17, 2003

(51) Int. Cl.
G06F 15/16 (2006.01)

(52) U.S. Cl. ............ 709/232; 379/100.13; 379/100.06; 379/355.04

(58) Field of Classification Search ................. 709/206, 709/225, 202, 232; 379/100.06, 355.04; 358/1.15; 726/6; 713/201; 370/352; 725/87
See application file for complete search history.

(56) References Cited

U.S. PATENT DOCUMENTS

| | | | |
|---|---|---|---|
| 4,837,798 A | 6/1989 | Cohen et al. .................. 379/88 |
| 4,910,765 A | 3/1990 | Matsuse et al. .............. 379/100 |
| 5,513,126 A | 4/1996 | Harkins et al. .......... 364/514 A |
| 5,630,060 A | 5/1997 | Tang et al. ............. 395/200.01 |
| 5,740,231 A | 4/1998 | Cohn et al. .................... 379/89 |
| 5,781,186 A | 7/1998 | Jennings ..................... 345/302 |
| 5,848,415 A | 12/1998 | Guck .......................... 707/10 |
| 5,864,870 A | 1/1999 | Guck .......................... 707/104 |
| 6,034,970 A | 3/2000 | Levac et al. ................. 370/466 |
| 6,073,165 A | 6/2000 | Narasimhan et al. ........ 709/206 |
| 6,092,114 A * | 7/2000 | Shaffer et al. ............... 709/232 |
| 6,101,320 A * | 8/2000 | Schuetze et al. ............ 709/206 |
| 6,119,137 A | 9/2000 | Smith et al. ................. 707/523 |
| 6,157,945 A | 12/2000 | Balma et al. ............... 709/206 |
| 6,167,441 A | 12/2000 | Himmel ....................... 709/217 |
| 6,212,550 B1 | 4/2001 | Segur .......................... 709/206 |
| 6,335,966 B1 * | 1/2002 | Toyoda ................... 379/100.06 |
| 6,661,798 B2 * | 12/2003 | Sano et al. .................. 370/400 |
| 6,956,942 B2 * | 10/2005 | McKinzie et al. ...... 379/355.04 |
| 7,039,949 B2 * | 5/2006 | Cartmell et al. ................ 726/6 |
| 2001/0047517 A1 * | 11/2001 | Christopoulos et al. ........ 725/87 |
| 2002/0009073 A1 * | 1/2002 | Furukawa et al. ........... 370/352 |
| 2002/0009987 A1 * | 1/2002 | Tobita et al. ................ 455/414 |
| 2002/0032725 A1 * | 3/2002 | Araujo et al. ............... 709/203 |
| 2002/0051181 A1 * | 5/2002 | Nishimura .................. 358/1.15 |
| 2002/0087647 A1 * | 7/2002 | Quine et al. ................. 709/206 |
| 2002/0103851 A1 * | 8/2002 | Kikinis ....................... 709/202 |
| 2002/0147780 A1 * | 10/2002 | Liu et al. ..................... 709/206 |
| 2002/0191596 A1 * | 12/2002 | Moyano et al. ............. 370/352 |
| 2003/0061508 A1 * | 3/2003 | Bhat ........................... 713/201 |

* cited by examiner

Primary Examiner—Nathan J. Flynn
Assistant Examiner—Dustin Nguyen
(74) Attorney, Agent, or Firm—John R. Biggers; Libby Z. Handelsman; Biggers & Ohanian, LLP

(57) ABSTRACT

A method of email administration including receiving in a transcoding gateway from a sender an email display capability request for a domain, wherein the capability request comprises a domain identification, finding in dependence upon the domain identification, at least one email display capability record for the domain, wherein the email display capability record for the domain comprises display capability attributes describing an email display capability for the domain, and sending at least one of the email display capability attributes to the sender.

21 Claims, 14 Drawing Sheets

| | | Display Capability Records 1100 | | | |
|---|---|---|---|---|---|
| 1102 | 1104 | 1106 | 1108 | 1110 | 1111 |
| Capability ID | Capability Description | Domain | Connection Type | Connection Address | Transcode Type |
| 1150 | Video on Grandma's PC | grandma.net | Email | grandma@grandma.net | Forward |
| 1152 | Audio on Grandma's PC | grandma.net | Email | grandma@grandma.net | Forward |
| 1154 | Video on Grandma's TV | grandma.net | Email | gm-tv@grandma.net | Forward |
| 1156 | Audio on Grandma's TV | grandma.net | Email | gm-tv@grandma.net | Forward |
| 1158 | TTS in Grandma's Car | grandma.net | Email | gm-car@grandma.net | Forward |
| 1160 | Recipe Dtabse on Gma's Stove | grandma.net | Email | recipes@grandma.net | Forward |
| 1162 | Image on Grandma's PDA | grandma.net | Email | gm-PDA@grandma.net | Forward |
| 1164 | Image on DAF in Gma's Lv Rm | grandma.net | HTTP | gm-daf@grandma.net | Transcode Here & Fwd |
| 1166 | Txt Overlay on DAF in Gma's Lv Rm | grandma.net | HTTP | gm-daf@grandma.net | Transcode Here & Fwd |
| 1168 | Audio on Gma's Stereo | grandma.net | HTTP | gm-stereo@grandma.net | Transcode Here |
| 1170 | Video Somewhere Else | someother.net | Email | x@someother.net | Forward |
| 1172 | Audio Player Coupled to this Gateway | someother.net | HTTP | y@someother.net | Transcode Here & Fwd |
| 1174 | TTS Somewhere Else | someother.net | Email | z@someother.net | Forward |

| Sender Authorization Records Domain: grandma.net | | |
|---|---|---|
| Authorization Record ID (1202) | Connection Address (1110) | Authorized Sender (1204) |
| 1250 | grandma@grandma.net | joe@grandson.net |
| 1252 | gm-tv.@grandma.net | joe@grandson.net |
| 1254 | gm-daf@grandma.net | joe@grandson.net |
| 1256 | gm-car@grandma.net | joe@grandson.net |
| 1258 | grandma@grandma.net | mike@soninlaw.net |
| 1260 | grandma@grandma.net | pete@favoritenephew.net |
| 1262 | gm-tv.@grandma.net | pete@favoritenephew.net |
| 1264 | gm-daf@grandma.net | pete@favoritenephew.net |
| 1268 | gm-car@grandma.net | pete@favoritenephew.net |
| 1270 | gm-PDA@grandma.net | pete@favoritenephew.net |
| 1272 | recipes@grandma.net | pete@favoritenephew.net |

Figure 13

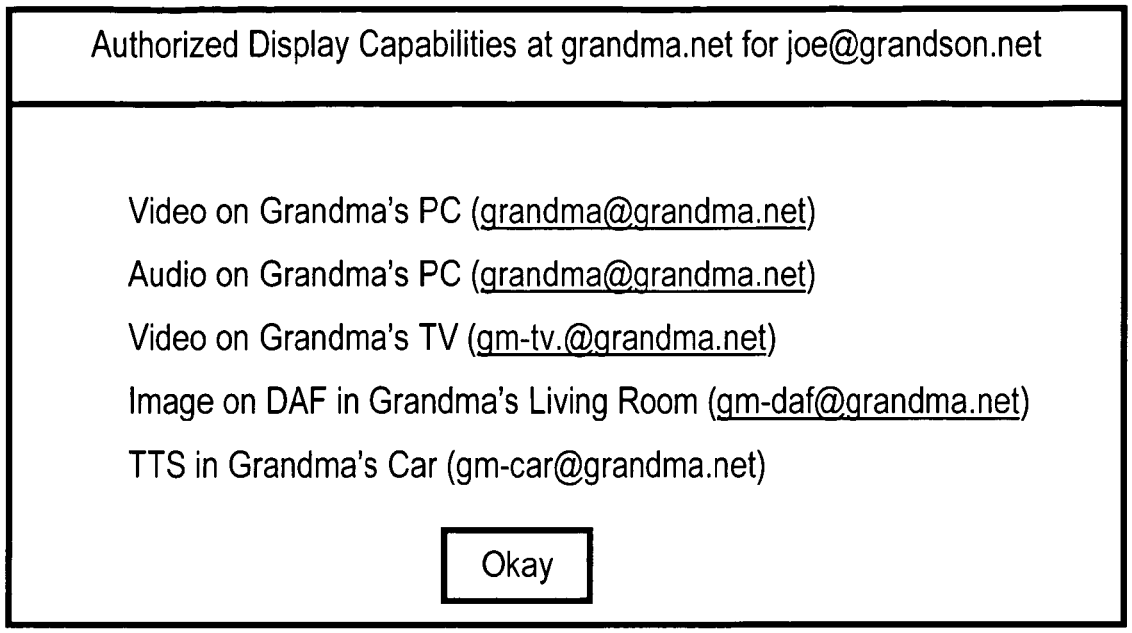

Authorized Display Capabilities at grandma.net for joe@grandson.net

Video on Grandma's PC (grandma@grandma.net)

Audio on Grandma's PC (grandma@grandma.net)

Video on Grandma's TV (gm-tv.@grandma.net)

Image on DAF in Grandma's Living Room (gm-daf@grandma.net)

TTS in Grandma's Car (gm-car@grandma.net)

Okay

| Virtual Address Forward Records | | |
| --- | --- | --- |
| 1502 | 1504 | 1506 |
| Virtual Address Forwarding Record ID | Virtual Address | Corresponding Conventional Forwarding Address |
| 1550 | gm-daf@grandma.net | grandma@grandma.net |
| 1552 | gm-stereo@grandma.net | |
| 1554 | y@someother.net | z@someother.net |

Figure 15

DYNAMIC INDICATION OF EMAIL CAPABILITIES

BACKGROUND OF THE INVENTION

1. Field of the Invention

The field of the invention is data processing, or, more specifically, methods, systems, and products for dynamically indicating email capabilities.

2. Description of the Related Art

Prior art email allows mail messages to be exchanged between users of computers around the world and out of the world, to space shuttles and the International Space Station. Internet email in particular provides a standard communications mechanism for millions of computers connected to the Internet.

In the early days of email, email messages were very limited in features. They were restricted to ASCII characters; they had maximum line lengths and maximum message lengths. Modern email messages, however, support digital objects comprising audio, video, and graphic images. The modern email standard for the Internet, initiated in 1992, is called 'MIME,' an acronym for Multipurpose Internet Mail Extensions. MIME allows mail messages to contain multiple digital objects in a single message, text having unlimited line length or overall length, character sets other than ASCII (allowing non-English language messages), multi-font messages, and binary or application specific files. Digital objects supported in MIME messages include graphic images, audio, video and multi-media messages.

Email messages are delivered to email clients, software application programs capable of connecting to the Internet through mail servers and downloading email messages from electronic mailboxes maintained in email servers. Examples of email clients are Microsoft's well-known email applications called Outlook™ and Outlook Express™.

In current art, email is delivered from email servers to email clients on personal computers. Email clients are often implemented on PDAs, network-enabled cellular telephones, and other devices in the general category of 'personal computer,' although, nevertheless, the emails are directed from email servers to email clients on some kind of personal computer. Personal computers are optimized for text display; this is true despite the fact that email clients in some personal computers today are capable of displaying video, graphic images, and audio, because personal computer are just not very good at displaying video, graphic images and audio. Television sets and video monitors are good at displaying video. High fidelity stereo and quadraphonic sound systems are good at displaying audio. High resolution digital art frames are good at displaying graphic images. In current art, however, there is no way to email a digital image to a digital art frame, no way to email a video clip to a television, no way to email a musical performance to a sound system, although it would be beneficial if there were. Moreover, despite the fact that destination email domains may support many, many client devices, display devices, and display capabilities for digital objects and files included in email, there is no convenient, dynamic way in current art to know the display capabilities available in an email destination, although it would be beneficial if there were.

SUMMARY OF THE INVENTION

Typical embodiments of the invention include a method of email administration. Example embodiments typically include receiving in a transcoding gateway from a sender an email display capability request for a domain, in which the capability request includes a domain identification, finding, in dependence upon the domain identification, at least one email display capability record for the domain, in which the email display capability record for the domain includes display capability attributes describing an email display capability for the domain, and sending at least one of the email display capability attributes to the sender.

In typical embodiments of the invention, the email display capability request typically includes a sender identification identifying the sender. Example embodiments typically include determining, in dependence upon the sender identification, that the sender is authorized to send email to a connection address in the domain. In some example embodiments, determining that the sender is authorized to send email to a connection address in the domain typically includes finding, in dependence upon the sender identification and in dependence upon the domain identification, at least one sender authorization record. In such example embodiments, the sender authorization record typically represents authorization for the sender to send email to a connection address in the domain, the sender authorization record typically sender authorization attributes including a connection address in the domain, and finding at least one email display capability record for the domain typically includes finding, in dependence upon the domain identification and in dependence upon the connection address, at least one email display capability record for the domain.

Example embodiments of the invention typically include receiving an email in a transcoding gateway, the email including an email address and at least one digital object, determining, in dependence upon display capability attributes and the email address, whether the digital object is to be transcoded in the transcoding gateway, wherein the determining results in a determination, and forwarding the email, including the digital object, to the email address, if the determination is that the digital object is not to be transcoded in the transcoding gateway. Other example embodiments typically include carrying out the steps of transcoding the digital object into a transcoded digital object, and downloading the transcoded digital object to a destination client device, if the determination is that the digital object is to be transcoded in the transcoding gateway.

In example embodiments transcoding the digital object typically includes transcoding the digital object into a digital file having a digital format and a file name, and downloading the transcoded digital object typically includes downloading the digital file to a destination client device at an internet address recorded in an internet address field of a client device record. Some example embodiments typically include the client device record having recorded in a mailbox address field in the client device record, a mailbox address identical to the email address of the email message, and having recorded in a digital file format code field of the client device record, a digital file format code indicating that the client device represented by the client device record is capable of receiving the digital format of the digital file.

In example embodiments of the invention, determining, in dependence upon display capability attributes and the email address, whether the digital object is to be transcoded in the transcoding gateway, typically includes finding a capability record having a connection address equal to the email address. In some example embodiments, forwarding the email typically includes forwarding the entire email, including the digital object, to an email client in another transcoding gateway in a client device.

The foregoing and other objects, features and advantages of the invention will be apparent from the following more particular description of exemplary embodiments of the invention, as illustrated in the accompanying drawings wherein like reference numbers represent like parts of the invention.

BRIEF DESCRIPTION OF THE DRAWINGS

FIG. 12 illustrates several examples of display capability records having display capability attributes.

FIG. 13 illustrates several examples of sender authorization records.

FIG. 14 illustrates an example of a GUI dialogue box useful in various embodiments for communicating to a sender the display capabilities of client devices in a domain.

FIG. 15 illustrates exemplary relations among virtual email addresses and corresponding conventional addresses.

DETAILED DESCRIPTION OF EXEMPLARY EMBODIMENTS

Introduction

Figure 1:
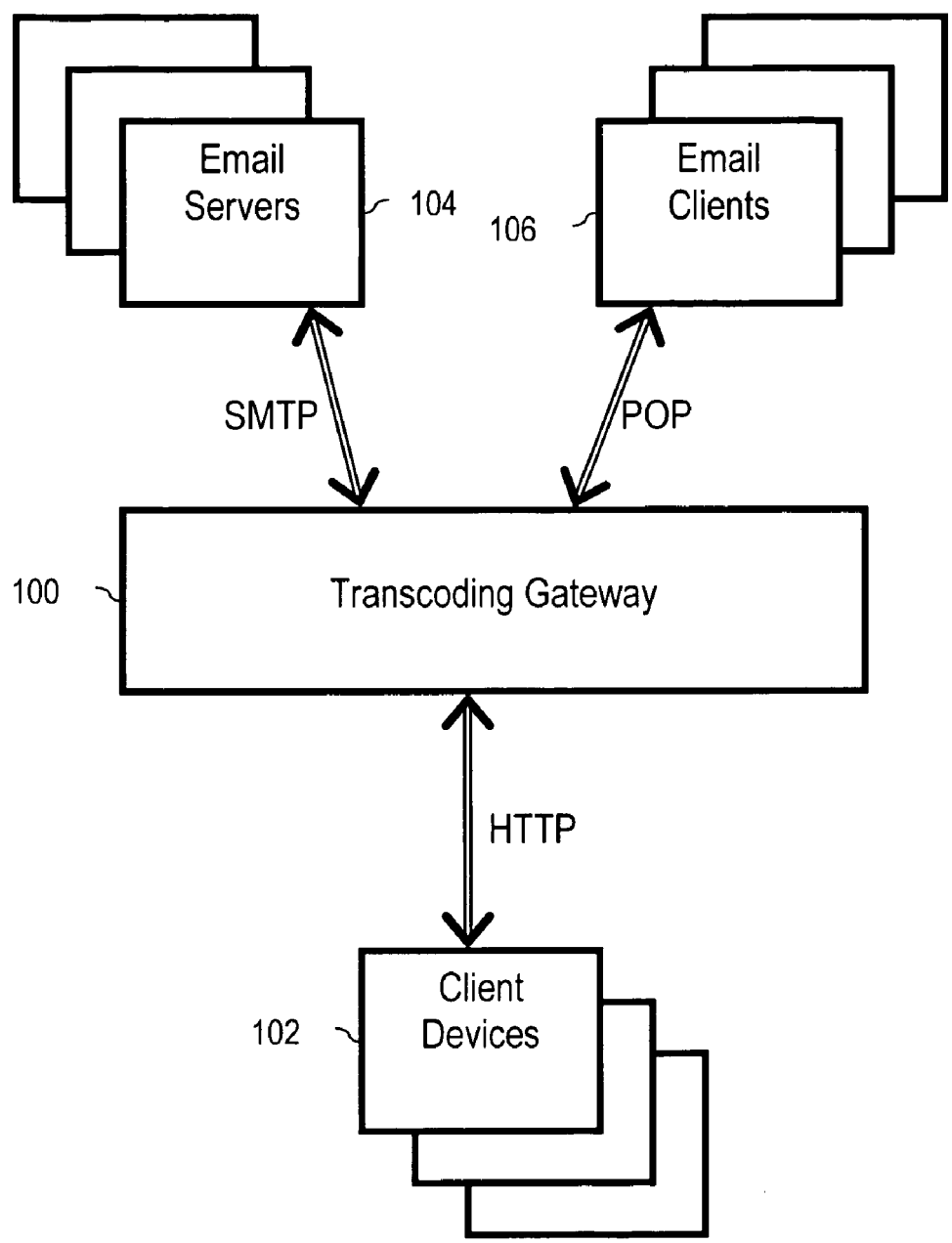
FIG. 1 is an overview schematic diagram of an embodiment including a transcoding gateway.

The present invention is described primarily in terms of methods for administration of email and particularly in terms of methods for dynamically indicating email capabilities. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Definitions

In this specification, the following terms are used as defined here. Other terms are defined elsewhere in the specification and used as defined.

"Digital object" means any data in email other than the text body and format headers of the email itself. Digital objects are said to be "included" in email in the sense that they are transmitted as parts of an email message, often in MIME-compliant settings. The sense in which digital objects are "included" in emails includes both actual integration within an email message as well as inclusion by reference to digital or binary files external to the main body of an email message. Although many embodiments of the present invention utilize MIME-compliant email, there is nothing within the present invention itself that requires MIME-compliance. Many other ways, beyond MIME, of including digital objects in email will occur those of skill in the art, and all such ways are well within the scope of the present invention.

"MPEG" is a standard digital format for video developed by the Moving Picture Experts Group, a working group within the International Standards Organization.

"MP3" is a standard file extension for MPEG, audio layer 3, a standard digital format for audio files.

"JPEG" is a standard digital format for color images developed by the Joint Photographic Experts Group.

"GIF" refers to "Graphics Interchange Format, a standard digital format for bitmapped color images.

"SMTP" means Simple Message Transfer Protocol, referring to the standard protocol for communicating email messages from email clients to email servers and from email servers to other email servers. In is typical in prior art that SMTP is used to communicate email messages from source email clients to mailbox locations, and POP is then used to communicate the email messages from mailboxes to destination email clients.

"POP" means Post Office Protocol, referring to the standard protocol for communicating email messages from email servers to email clients. "POP3" is a standard Post Office Protocol capable of communicating email messages among email servers and both to and from email clients, which means that POP3 is now useful as a single email protocol with no need for SMTP.

In this specification, the terms "field," "data element," and "attribute" are used as synonyms, referring to individual elements of digital data. Aggregates of data elements are referred to as "records" or "data structures." Definitions of complex data structures that include member methods, functions, or software routines in addition to data elements are referred to as "classes." Instances of complex data structures are referred to as "objects" or "class objects."

"Browser" means a web browser, a software application for locating and displaying web pages. Typical browsers today can display text, graphics, audio and video.

"Client device" refers to any device capable of coupling for data communications to a transcoding gateway. Examples of client devices are personal computers, internet-enabled special purpose devices, internet-capable personal data administrators, and others that will occur to those of skill in the art. Various embodiments of client devices are capable of wired and/or wireless couplings to transcoding gateways. The use as a client device of any instrument capable of accessing a server through a network is well within the present invention.

"LAN" means local area network.

"Network" is used in this specification to mean any networked coupling for data communications. Examples of networks useful with the invention include intranets, extranets, internets, local area networks, wide area networks, and other network arrangements as will occur to those of skill in the art. The use of any networked coupling from client devices to one or more transcoding gateway servers is well within the scope of the present invention.

"Server" in this specification refers to a computer or device comprising automated computing machinery on a network that manages network resources. In this sense, transcoding gateways in some embodiments are servers that manage network traffic; in some embodiments of the present invention, such network traffic includes email messages, HTML documents, and digital objects. Typical digital objects include JPEG files, MPEG files, MP3 files, GIF files, and so on.

"Transcode" means reconfiguring a digital object or file into a form or format suitable for display on a particular display device. MPEG files, for example, are 'transcoded' to have frame rates suitable for a particular video display. JPEG files, for example, are 'transcoded' to fit the screen size of a particular bit mapped computer screen. Many means and methods of transcoding will occur to those of skill in the art, and all such means and methods are well within the scope of the present invention.

A "transcoding gateway" is a server capable of transcoding messages from one format to another, as for example, from email objects to files stored in file systems or from digital object in emails to transcoded digital object suitable for display upon display devices, including for example, video screen, audio players, digital art frames, television sets controlled by set top boxes, text to speech converters in automobiles, and so on. Transcoding gateways are "gateways" in the sense that they carry out their server functions by use of than one protocol, as for example, a transcoding gateway that receives email messages using POP and distributes digital objects in HTML documents using HTTP. Transcoding gateways also are 'gateways' in the sense that they implement uplinks between LANs and WANs; in many embodiments, a WAN so uplinked is an Internet.

"URL" means Uniform Resource Locator, the standard method of associating World Wide Web data locations with network addresses for data communications. A URL typically includes an internet protocol address, or a domain name that resolves to an internet protocol address, identifying a location where a resource is located on a network. URLs directed to particular resources, such as particular HTML files, JPEG files, or MPEG files, typically include a path name or file name locating and identifying a particular resource in a file system coupled to a network. To the extent that a particular resource, such as a CGI file or a servlet, is executable, a URL often includes execution parameters.

"WAN" means wide area network.

"World Wide Web," or more simply "the web," refers to the well-known system of internet protocol ("IP") servers that support specially formatted documents, documents formatted in a language called "HTML" for HyperText Markup Language. The term "Web" is used in this specification also to refer to any server or connected group or interconnected groups of servers that implement the HyperText Transport Protocol, "HTTP," in support of URLs and HTML documents, regardless whether such servers or groups of servers are coupled to the world wide web as such.

"TDMA" stands for Time Division Multiple Access, a technology for delivering digital wireless service using time-division multiplexing. TDMA works by dividing a radio frequency into time slots and then allocating slots to multiple calls. In this way, a single frequency can support multiple, simultaneous data channels. TDMA is used by GSM.

"GSM" stands for Global System for Mobile Communications, a digital cellular standard. GSM at this time is the de facto standard for wireless digital communications in Europe and Asia.

"CDPD" stands for Cellular Digital Packet Data, a data transmission technology developed for use on cellular phone frequencies. CDPD uses unused cellular channels to transmit data in packets. CDPD supports data transfer rates of up to 19.2 Kbps.

"GPRS" stands for General Packet Radio Service, a standard for wireless data communications which runs at speeds up to 150 Kbps, compared with current GSM systems which cannot support more than about 9.6 Kbps. GPRS, which supports a wide range of speeds, is an efficient use of limited bandwidth and is particularly suited for sending and receiving small bursts of data, such as e-mail and Web browsing, as well as large volumes of data.

"EDGE" stands for Enhanced Data Rates for GSM Evolution, a standard for wireless data communications supporting data transfer rates of more than 300 Kbps. GPRS and EDGE are considered interim steps on the road to UMTS.

"UMTS" stands for Universal Mobile Telecommunication System, a standard for wireless data communications supporting data transfer rates of up to 2 Mpbs. UMTS is also referred to W-CDMA for Wideband Code Division Multiple Access.

"Bluetooth" refers to the Bluetooth Specification, a specification for short range radio links among mobile personal computers, mobile phones, and other portable devices.

"802.11(b)" refers to IEEE standard number 802.11(b), a standard of wireless local area network communications.

"HomeRF" refers to the Home Radio Frequency LAN standard promulgated by the HomeRF Working Group. HomeRF is designed to be more affordable for homes, as contrasted with 802.11(b) which was designed for business use.

A "service gateway" is an OSGI-compliant host server, server software installed and running on server computer hardware. "OSGI" refers to the Open Services Gateway Initiative, a computing industry organization developing specifications for service gateways, including specifications for delivery of "service bundles." OSGI service bundles are software middleware providing compliant data communications and services through service gateways. The Open Services Gateway specification is a java based application layer framework that gives service providers, network operator device makers, and appliance manufacturer's vendor neutral application and device layer APIs and functions. An "API" is an Application Program Interface, a set of routines, protocols, and tools for building software applications.

A service gateway often is a home or business server, a separate computer coupled for data communications through a local area network or "LAN" to client devices. Client devices include any device capable of adaptation for data communications, including, for example, automobiles, vending machines, cash registers, gasoline pumps, RFID readers, clocks, window shade controllers, door locks, smoke detectors, proximity detectors, television sets, radios, electric light switches, thermostats, thermometers, air conditioners, heaters, medical monitoring equipment, refrigerators, cook tops on stoves, ovens, coffee makers, water heaters, and so on.

A service gateway often is an embedded server inserted in a LAN not only for providing data communications among client devices, but also to connect a wide area network or "WAN," such as an external internet or extranet, to internal client devices within a home, office, or business setting. A service gateway sometimes is an embedded server installed and running in the same physical device or cabinet with a client device.

"Embedded server" means a Java embedded server, a small-footprint application server that can be embedded in any networked device, home gateway, or client device. Embedded servers typically are zero-administration devices intended, when implemented as service gateways, to divide a network architecture into an external WAN and an internal LAN. An embedded server manages services deployed from trusted external resources to internal client devices over a network, including for example, services implemented through OSGI-compliant service bundles. Embedded servers enable deployment and installation of services, such as OSGI-compliant service bundles, on a just-in-time basis, when the services are needed from time to time for use by client devices.

DETAILED DESCRIPTION

Turning now to FIG. 1, a first aspect is seen illustrated as a transcoding gateway configured to accept email from email servers (104), deliver the email to email clients (106), and transcode and deliver digital objects from the email to client devices (102). The embodiment illustrated in FIG. 1 comprises a 'gateway' in the sense of providing connections among more than one protocol, in the illustrated example embodiment, SMTP for receipt of email from other servers, POP for delivery of email to email clients, and HTTP for delivery of digital objects to client devices.

Figure 1A:
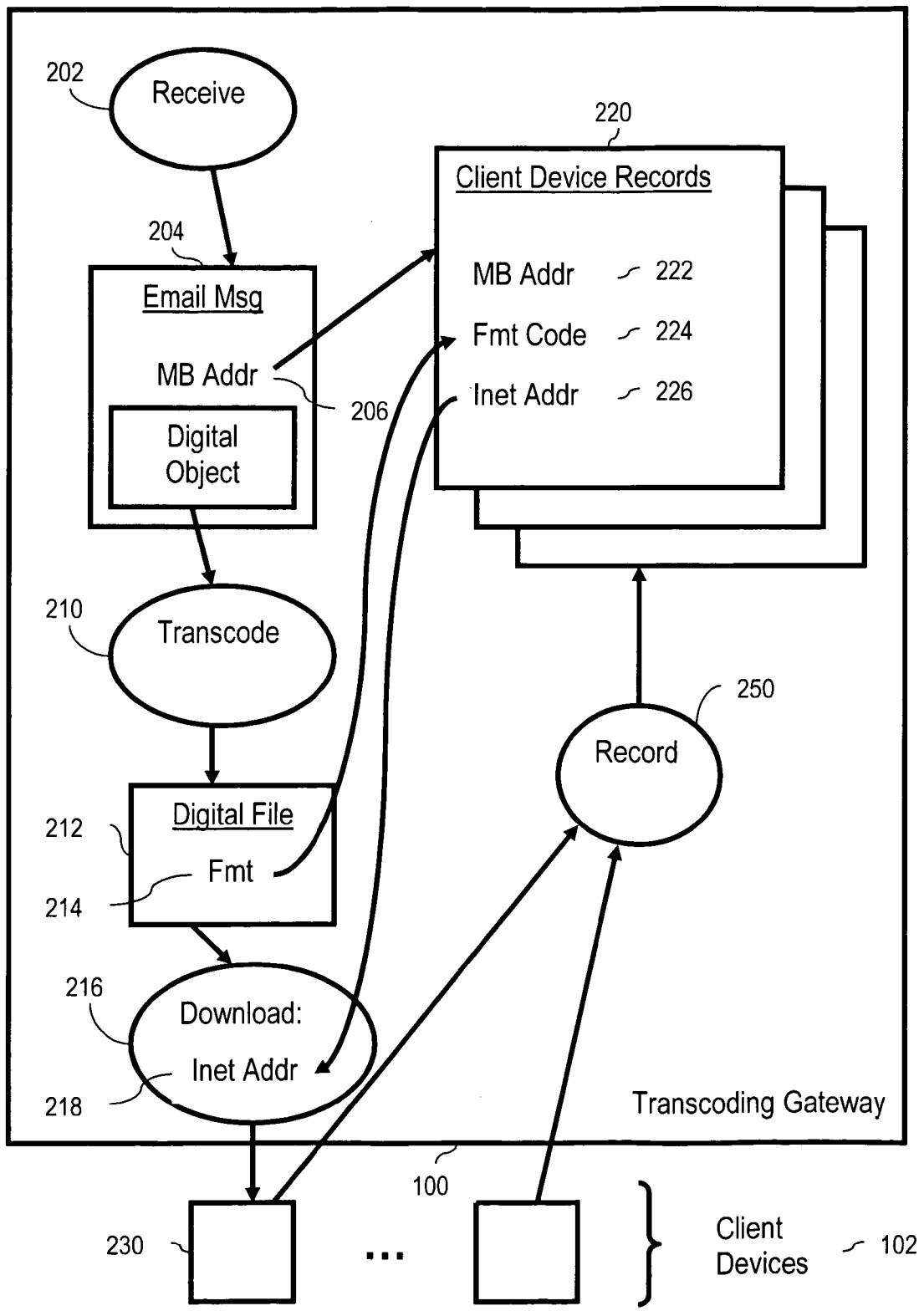
FIG. 1a is a data flow diagram of an embodiment within a transcoding gateway.

Turning to FIG. 1a, a further embodiment is seen illustrated as a method of email administration, in which the method is implemented in a transcoding gateway (100), the transcoding gateway comprising client device records (220) stored in computer memory, each client device record representing a client device (102). In the illustrated embodiment, each client device record includes a mailbox address field (222), an internet address field (226), and a digital file format code field (224).

As will be discussed below in more detail, many embodiments include in client device records a path name field. Typical embodiments of the kind illustrated in FIG. 1a also include in transcoding gateways at least one file system, each file system further comprising file system storage locations, each file system storage location having a path name.

Typical embodiments of the kind illustrated include receiving (202) in a transcoding gateway an email message (204). In typical embodiments, the email message includes at least one destination mailbox address (206) and at least one digital object (208).

Typical embodiments of the kind illustrated also include transcoding (210) the digital object into a digital file having a digital format (214) and a file name. Typical embodiments include downloading (216) the digital file to a destination client device (230) at an internet address (218) recorded in an internet address field (226) of a client device record (220). In typical embodiments, the client device record having the recorded internet address for the destination client device is a client device record having recorded in the client device record's mailbox address field (222) a mailbox address identical to the destination mailbox address (206) of the email message and, recorded in the client device record's digital file format code field (224), a digital file format code indicating that the client device represented by the client device record is capable of receiving the digital format (214) of the digital file (212). In typical embodiments of the kind illustrated, downloading the digital file is carried out by use of HTTP.

Embodiments of the kind illustrated in FIG. 1a typically include recording (250) a multiplicity of client device records (220) representing a multiplicity of client devices (102). Recording client device records in such embodiments typically includes recording for each client device represented by a client device record a mailbox address, an internet address where the client is to be found on an internet, a digital file format code identifying a digital file format that the client device is capable of receiving, and a path name identifying a location in a file system where digital files for each client device are to be stored.

In embodiments of the kind illustrated, receiving an email message typically includes receiving an email message by use of a standard email protocol. Examples of email protocols useful for receiving email messages in various embodiments of the invention include SMTP and POP3. Persons of skill in the art will identify other email protocols useful for receiving email messages in various embodiments of the invention, the use of all such email protocols being well within the scope of the present invention.

In embodiments of the kind illustrated, the file name typically includes a file name extension identifying the digital format of the digital file. Video files, for example, have file names like MyFile.MPEG, where MPEG is a file name extension identifying the digital format of a video file. Audio files, for example, have file names like MyFile.MP3, where MP3 is a file name extension identifying the digital format of an audio file. Image files, for example, have file names like MyFile.GIF, where GIF is a file name extension identifying the digital format of an image file. Image files, as another example, have file names like MyFile.JPEG, where JPEG is a file name extension identifying the digital format of an image file.

In embodiments of the kind illustrated, each client device represented by a client device record typically comprises automated computing machinery, a web browser, and an internet client having an internet address. There is no requirement within the present invention that the internet client have any particular kind of internet address. Embodiments include internet addresses as any internet protocol address useful to locate the internet client on the Internet. Internet addresses useful with various embodiments of the invention include local internet protocol addresses, private internet protocol addresses, and official registered Internet addresses.

Figure 1B:
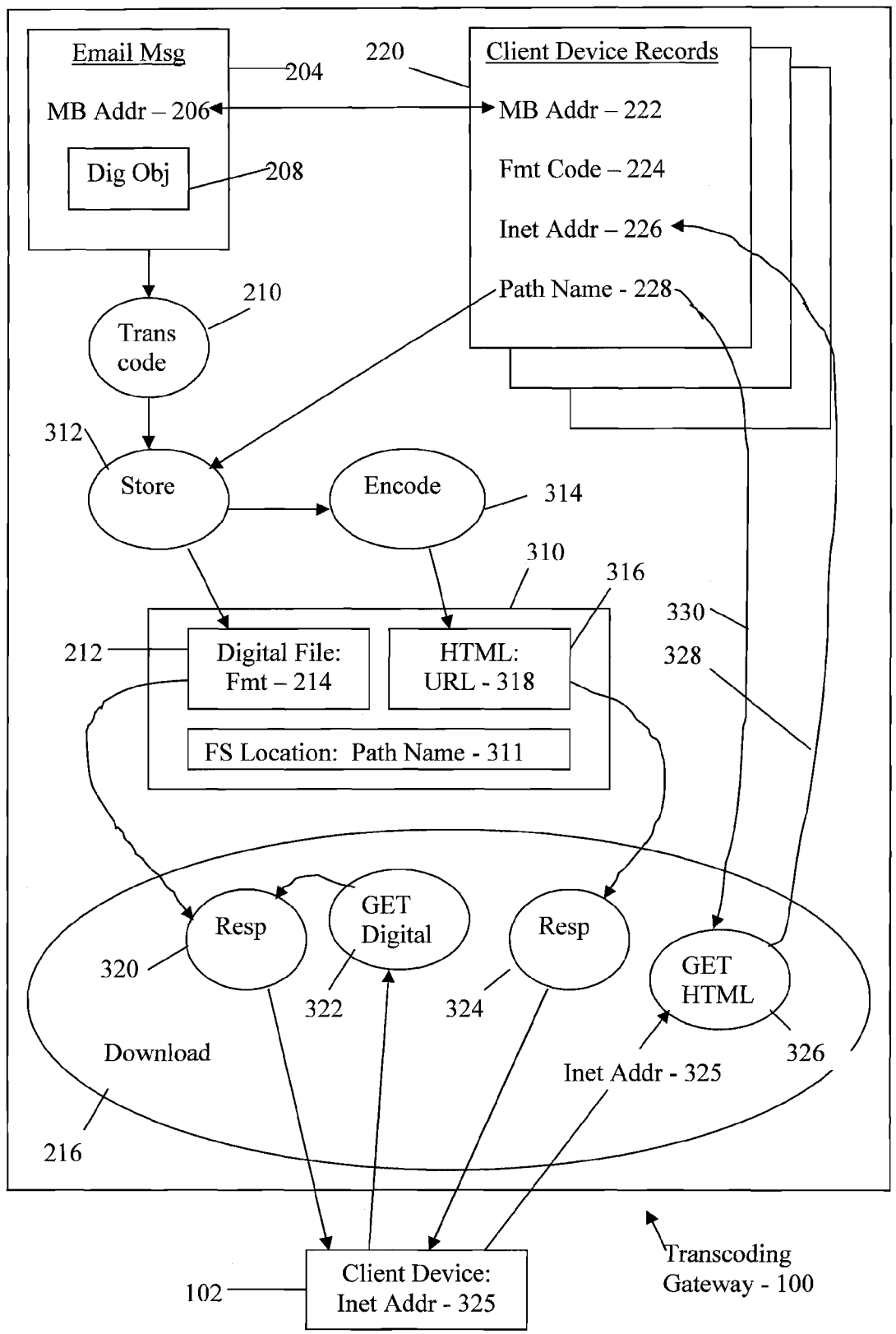
FIG. 1b is a data flow diagram of a more detailed embodiment within a transcoding gateway.

Turning now to FIG. 1b, more detailed embodiments are shown to include storing (312) a digital file (212) in a file system location (310) having a digital file path name (311) identical to a path name recorded in a path name field (228) in a client device record (220). The client device record indicating the correct path name for storing the digital file is typically a client device record having recorded in its mailbox address field (222) a mailbox address equal to the mailbox address (206) of the email message.

Embodiments of this kind typically include encoding (314) the digital file path name and the file name of the digital file into an HTML document (316) having a conventional file name such as, for example, "index.html" or "index.htm." In such embodiments, encoding the digital file path name and the file name of the digital file into an HTML document typically includes encoding a URL (318) in a hyperlink in an HTML document. In such embodiments, the URL typically includes the path name of the location of the digital file and the file name of the digital file. Many such embodiments include storing the HTML document in the file system location identified by the path name, the path name of the file system location where the digital file is stored.

In this kind of embodiment, downloading the digital file to the client device typically includes downloading the HTML document. Many embodiments of the present invention utilize HTTP to download a digital file. In such embodiments, it is typical for downloading the digital file to include receiving from a client device (102) a first HTTP request message (326) requesting the HTML file having the conventional file name, wherein the first HTTP request message includes a client internet address (325) for the client device (102). Such embodiments typically include sending, in an HTTP response message (324) to the client device, the HTML document (316) having the conventional file name from a file system location identified as a path name recorded in a client device record's path name field (228) of a client device record. The client device record having the correct path name to locate the HTML document is a client device record whose internet address field contains an internet address equal to the client internet address, the client internet address passed to the download in the first HTTP request message.

Such embodiments typically include receiving from the client device a second HTTP request message (322), wherein the second HTTP request message requests downloading (320) of the digital file identified by the path name and the file name of the digital file encoded into the HTML document. In typical embodiments, the download is completed by use of a second HTTP response message (320) that embodies the digital file (212).

In many embodiments, receiving an email message includes posting an email message to a destination mailbox at the destination mailbox address. In many embodiments, posting an email message to a destination mailbox is included as part of receiving an email message by use of SMTP. Many such embodiments include delivering an email message from the destination mailbox to an email client, wherein the delivering is carried out by use of a standard email protocol such as, for example, POP or POP3. Persons of skill in the art will identify other email protocols useful in various embodiments of the invention for delivering email messages to email clients, the use of all such email protocols being well within the scope of the present invention.

Typical embodiments of the invention are operative for client devices that are audio players and the digital format MP3. Typical embodiments of the invention are operative for client devices that are video players and the digital format MPEG. Typical embodiments of the invention are operative for client devices that are digtal picture frames and the digital format JPEG. Typical embodiments of the invention are operative for client devices that are digital picture frames and the digital format GIF. Many other combinations of client device and digital format will occur to those of skill in the art, all such combinations being perfectly useful within the scope of the present invention.

While embodiments are described for email comprising digital objects having the digital formats JPEG, MPEG, MP3, and GIF, persons skilled in the art will recognize many alternative digital formats that are useful with the invention, all such digital formats being well within the scope of the invention. While embodiments are described generally in terms of HTTP and HTML as they are often associated with URL processing in the Web, those skilled in the art will readily appreciate that other internet protocols are known and are adaptable to the teachings of the invention. Many such adaptations will occur to those of skill in the art, all such adaptations being well within the scope of the present invention.

Figure 2:
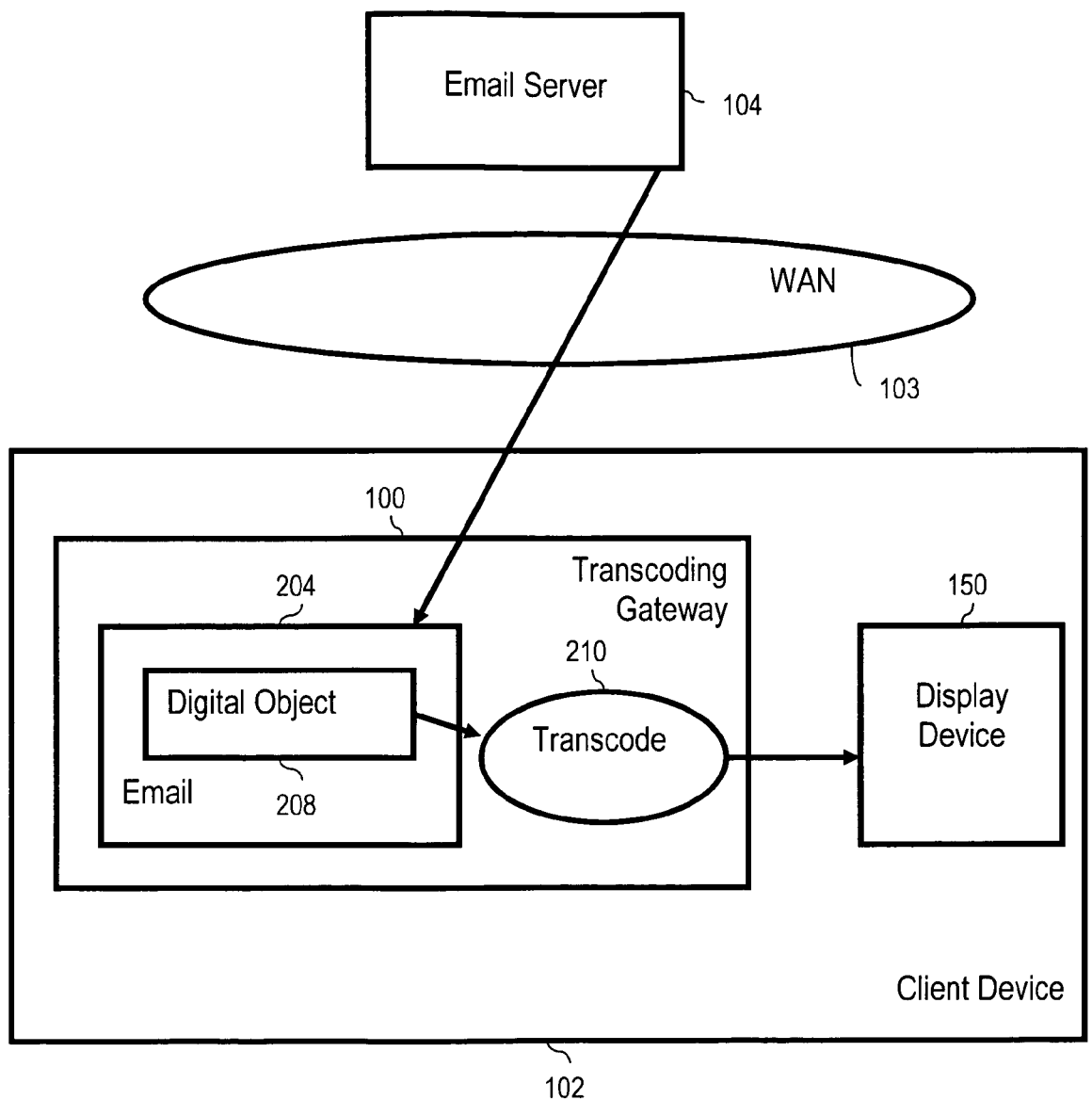
FIG. 2 is an overview data flow diagram of an example embodiment of a client device comprising a transcoding gateway.

Turning to FIG. 2, an additional example embodiment is illustrated in which a client device comprises a transcoding gateway and a display device. In typical embodiments according to FIG. 2, email (204) bearing digital objects (208) is received in a transcoding gateway (100). The digital objects are transcoded (210) into a format suitable for display and then displayed on one or more display devices (150). Exemplary embodiments according to FIG. 2 include client devices that are set top boxes on televisions. In such embodiments, display devices include video monitors and audio players, and digital objects include video clips, audio files, graphic images, text to speech files, and text overlays.

In typical embodiments, digital objects are embedded or attached to email in the form of digital files having display format types, whose display format types are often indicated in a file name extension. Video files, for example, often have file names like MyFile.MPEG, where MPEG is a file name extension identifying the display format of a video file. Audio files, for example, often have file names like MyFile.MP3, where MP3 is a file name extension identifying the display format of an audio file. Image files, for example, often have file names like MyFile.GIF, where GIF is a file name extension identifying the display format of an image file. Image files, as another example, often have file names like MyFile.JPEG, where JPEG is a file name extension identifying the display format of an image file.

Figure 3:
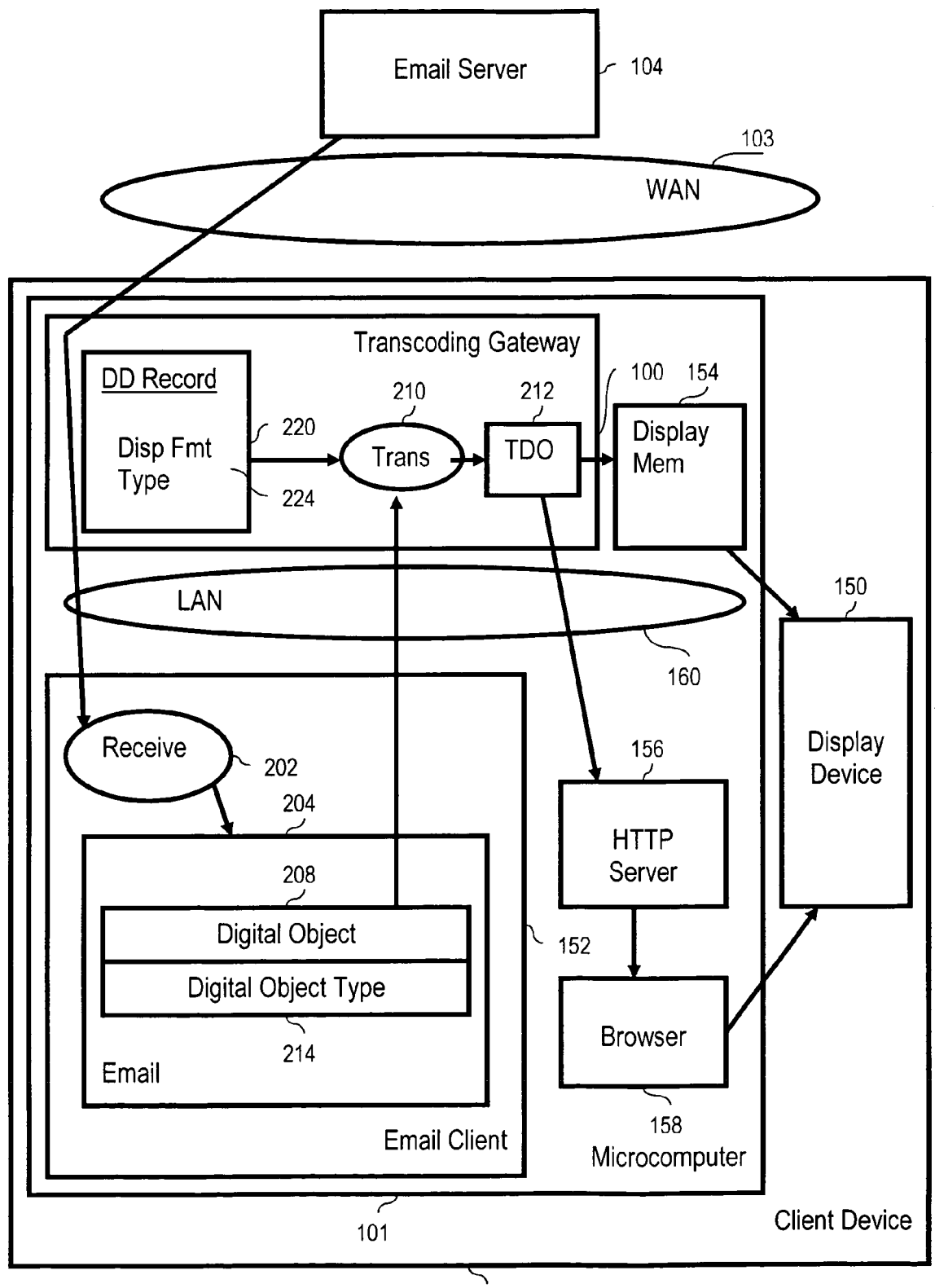
FIG. 3 is an overview data flow diagram of an additional, more detailed example embodiment of a client device comprising a transcoding gateway.

Turning to FIG. 3, a further embodiment is seen illustrated as a method of email administration, in which the method is implemented within and upon a client device (102), the client device comprising a transcoding gateway (100), the transcoding gateway comprising display device records (220) stored in computer memory, each display device record representing a display device (150) (one shown). In the illustrated embodiment, the display device record (220)

includes a display format type (224), that is, a field or attribute that identifies a display format type supported by the display device represented by the display device record. More specifically, in embodiments according to FIG. 3, the transcoding gateway often includes, for each display device, a display device record (220) comprising display format attributes (240) of each display device, wherein the display format attributes include a display format type (224) for each display device.

Figure 6:
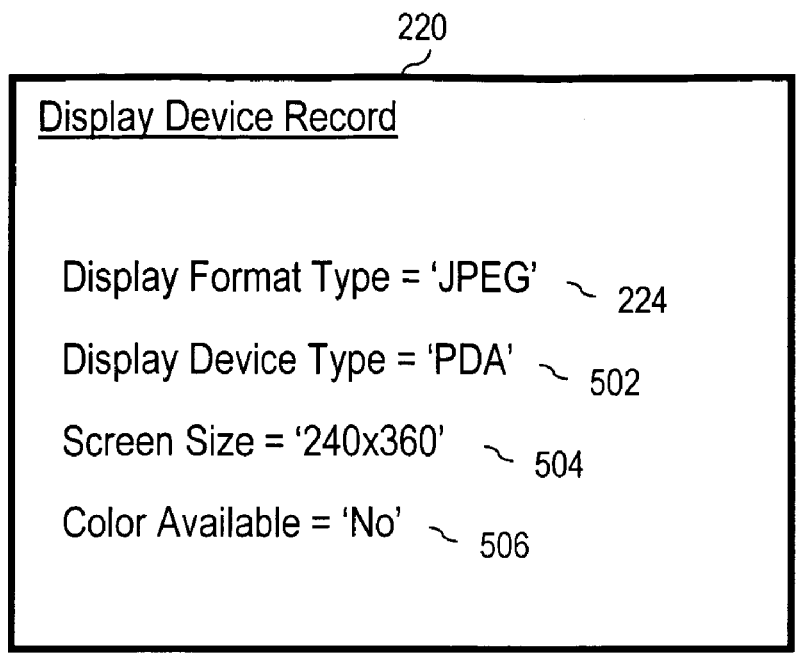
FIG. 6 illustrates an example display device record for a PDA.
Figure 7:
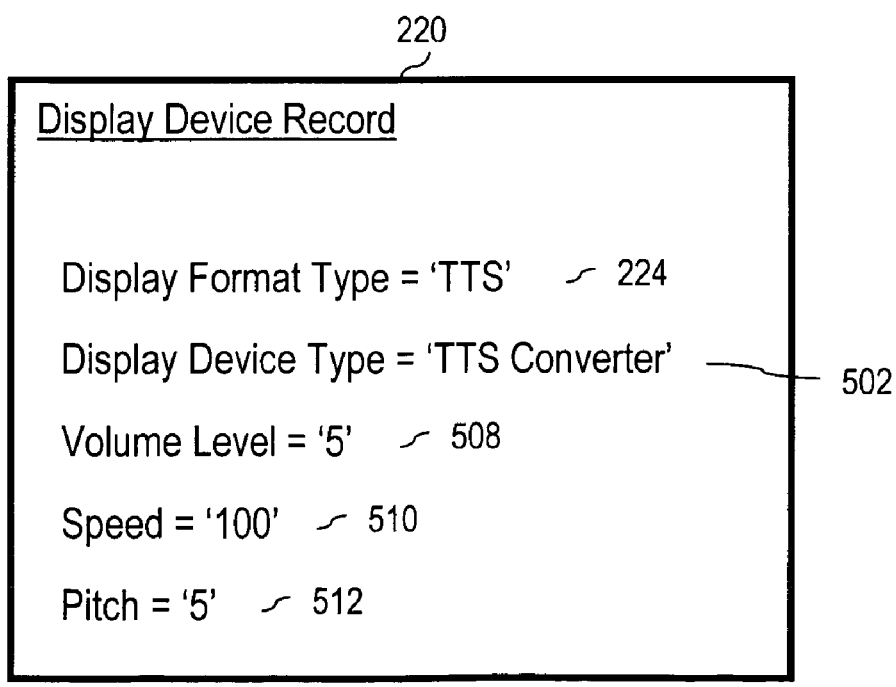
FIG. 7 illustrates an example display device record for a text-to-speech converter.
Figure 8:
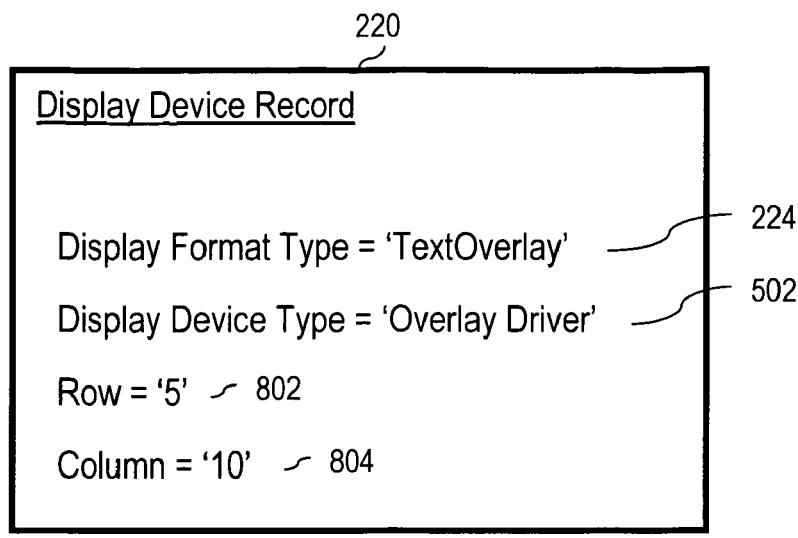
FIG. 8 illustrates an example display device record for a text overlay driver.
Figure 9:
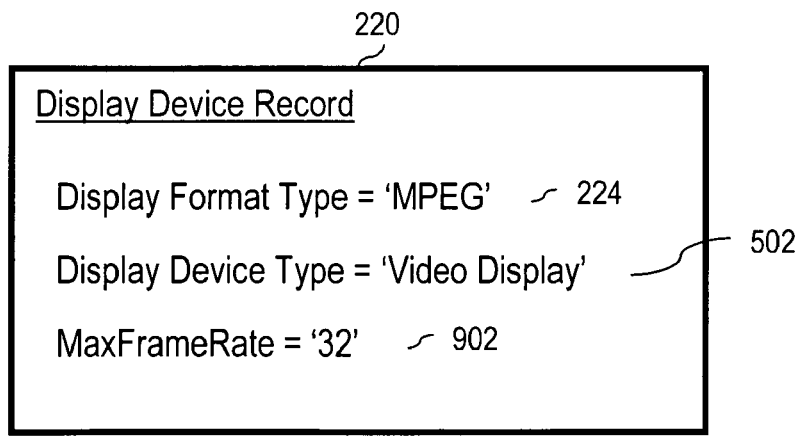
FIG. 9 illustrates an example display device record for a video display.
Figure 10:
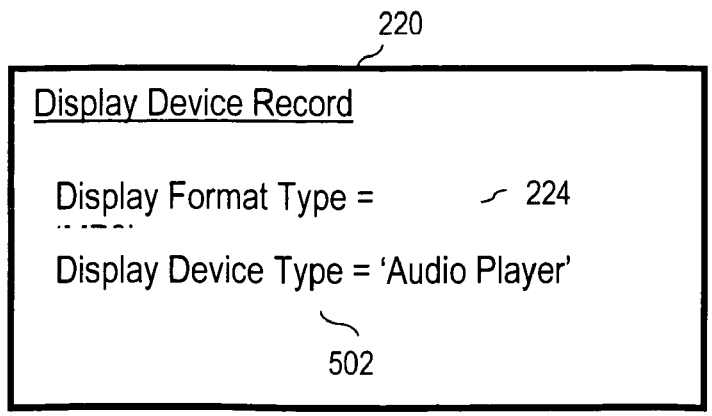
FIG. 10 illustrates an example display device record for an audio player.

FIGS. 6–10 illustrate several examples of more detailed display device records (220). As shown in FIGS. 6–10, it is usual in various embodiments of the invention for display device records (220) to include an attribute identifying the display device type (502), as well as other attributes for use in transcoding digital objects into formats suitable for display on a particular type of client device. FIG. 6, for example, illustrates a display device record for a personal digital assistant or "PDA," having a screen size (504) limited to only 240×360 pixels with no color capability (506). FIG. 7 illustrates an example display device record for a text to speech converter (502) with default transcoding support attributes for volume level scaled 1 to 10 (508), speech speed in word per minute (510), and speech pitch on a scale of 1 to 10 (512). FIG. 8 illustrates an example display device record representing a text overlay driver (502) having transcoding support attributes identifying the row (802) and column (804) of the screen position for text display. FIG. 9 illustrates an example display device record representing a video display (502) with a transcoding support attribute identifying the maximum frame rate of the display (902). FIG. 10 illustrates an example display device record representing an audio player (502) for MP3 files (224). From this discussion and the drawings, it is now clear that many alternative forms of display device records will occur to those of skill in the art and that all such forms are well within the scope of the present invention.

As readers will understand from the discussion of embodiments illustrated by FIGS. 6–10, client devices are included in any physical device capable of supporting a coupling for data communications to an email server. Client devices include set top boxes for television sets, the set top boxes coupled to email servers through wideband cable network connections. Client devices include digital art frames coupled through OSGI-compliant service gateways to wideband Internet connections. In some embodiments, transcoding gateways include OSGI-compliant service bundles downloaded to microcomputers on client devices through OSGI-compliant service gateways. Transcoding gateways implemented by use of OSGI-compliant service bundles typically include a JAVA installation on a microcomputer on a client device; in some exemplary embodiments of this kind, using OSGI-compliant service bundles, the transcoding gateway itself optionally is implemented as a JAVA embedded server.

Client devices include automobiles having integrated display devices comprising text to speech converters, wherein a microcomputer implements a wireless network coupling to an email server. Client devices include PDAs and network-enabled cellular telephones that implement wireless network couplings to email servers. Many other client devices capable of supporting couplings for data communications with email servers will occur to those of skill in the art, all such client devices being well within the scope of the present invention. Wireless network couplings to email servers include wireless couplings implemented by use of, for example, TDMA, GSM, CDPD, GPRS, EDGE, UMTS, Bluetooth, 802.11b, and HomeRF. Other wireless network couplings will occur to those of skill in the art. The use of any wireless network coupling is well within the scope of the present invention.

Embodiments according to FIG. 3 typically include receiving (202) through a transcoding gateway (100) an email message (204), wherein the email message comprises at least one digital object (208) having a digital object type (214). In embodiments of the kind illustrated, receiving an email message typically includes receiving an email message by use of a standard email protocol. Examples of email protocols useful for receiving email messages in various embodiments of the invention include SMTP and POP3. Persons of skill in the art will identify other email protocols useful for receiving email messages in various embodiments of the invention, the use of all such email protocols being well within the scope of the present invention.

In such embodiments, the transcoding gateway (100) typically is coupled to one or more display devices. The coupling between the transcoding gateway and a display device in some embodiments is more or less direct, such as for example, a segment of computer memory reserved as display memory (154) to which the transcoding gateway directly writes digital objects for use by the display device (150). Other embodiments include more or less indirect couplings between a transcoding gateway (100) and a display device (150) as a browser (158) to which transcoded digital objects are sent as digital files for display. Browsers support applets and plug-ins capable of displaying a wide variety of digital formats. Browsers typically display, for example, text, graphics, audio and video.

Embodiments according to FIG. 3 typically include finding (210) a display device record for a destination display device (150), wherein the destination display device (150) comprises a display device having a display format type (224) that is the same as the digital object type (214), and transcoding the digital object (210) in dependence upon the display format attributes (240) of the destination display device. Such embodiments include displaying (210) the transcoded digital object (212) on a destination display device (150).

Some embodiments, as shown in FIG. 3, include within a client device a display device (150) and a microcomputer (100), so that the microcomputer further includes a transcoding gateway (100), an email client (152), a web browser (158), and an HTTP server (156), wherein the transcoding gateway, the email client, the web browser, and the HTTP server are coupled for data communications (160). In this context, 'coupled for data communications' means coupled through a LAN implemented on the same microcomputer, so that data communications among the transcoding gateway, the email client, the browser and the HTTP server are carried out in some standard protocol such as the internet protocol, for example. This kind of embodiment has the advantage of using some components available more or less 'off the shelf,' as are email clients, browsers, and HTTP servers.

In this kind of embodiment, as shown in FIG. 3, an email client (204) receives (202) email directly from an email server (104) across a WAN (102) such as, for example, the Internet. This kind of embodiment illustrates another sense in which the transcoding gateway is a 'gateway,' that is, in that the transcoding gateway (100) implements an uplink between a LAN (160) and a WAN (102).

Figure 4:
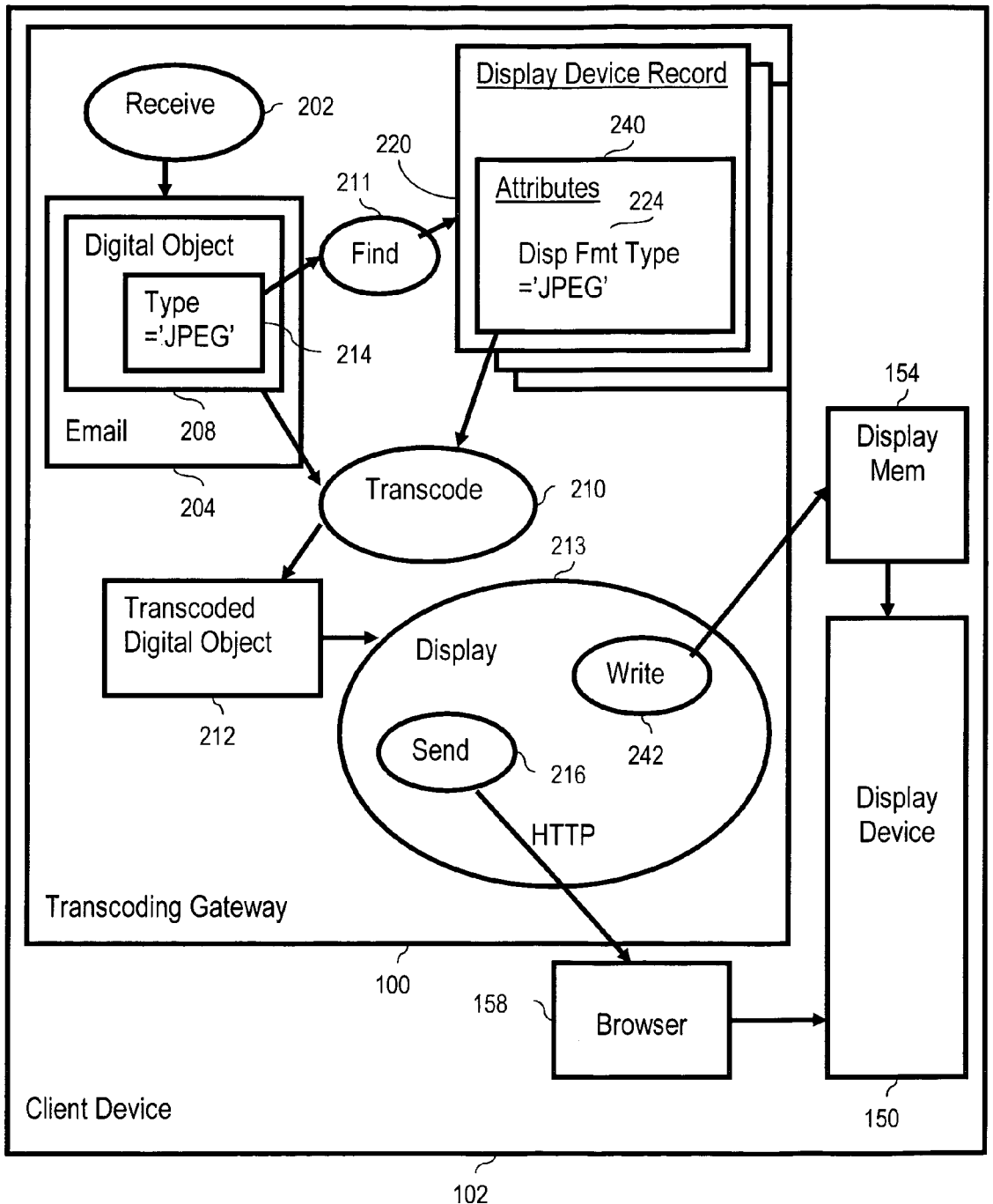
FIG. 4 is an overview data flow diagram of a further, more detailed example embodiment of a client device comprising a transcoding gateway.

In other embodiments, the transcoding gateway itself includes an email client (150), a web browser (158), and an HTTP server (156). FIG. 4, for example, illustrates an embodiment in which email (204) is received directly within a transcoding gateway (100). In the embodiment of FIG. 4, an HTTP service function is implemented by sending (216) transcoded digital objects (212) to a browser (158) via HTTP. In embodiments according to FIG. 4 displaying (210) a transcoded digital object (212) on a destination display device (150) often includes writing the transcoded digital object to display memory (154). In such embodiments, displaying (210) the transcoded digital object (212) on the destination display device (150) often includes sending (216) the transcoded digital object to a browser.

Embodiments according to FIG. 4 have the advantage that the email client functionality and HTTP server functionality in such embodiments is relatively simple compared to the usual full-blown email clients and web servers familiar in the art. Email clients in such embodiments, for example, need only implement sufficient functionality to download email messages from an email server using a standard protocol, such as POP or POP3, and make included digital objects accessible to the transcoding function (210) by, for example, storing included digital objects in a known or predetermined memory location. For such email clients most elements of standard email clients would be entirely optional, including most aspects of user interface, provisions for user manipulation of long term storage of email, provisions for elaborate user help systems, and provisions for user customization of functionality.

Use of such simplified email clients eases the cost of development and manufacture of some embodiments of the present invention. It is an engineering decision in particular embodiments whether to develop a simplified email client or to take an existing email client and implement it, for example, in firmware embedded in a microcomputer in a client device. In some embodiments, for example, a simplified email client is adequate in functionality, less expensive to manufacture, but more expensive to develop than an 'off the shelf' email client. Similar software engineering considerations naturally apply to many elements of various embodiments.

Figure 5:
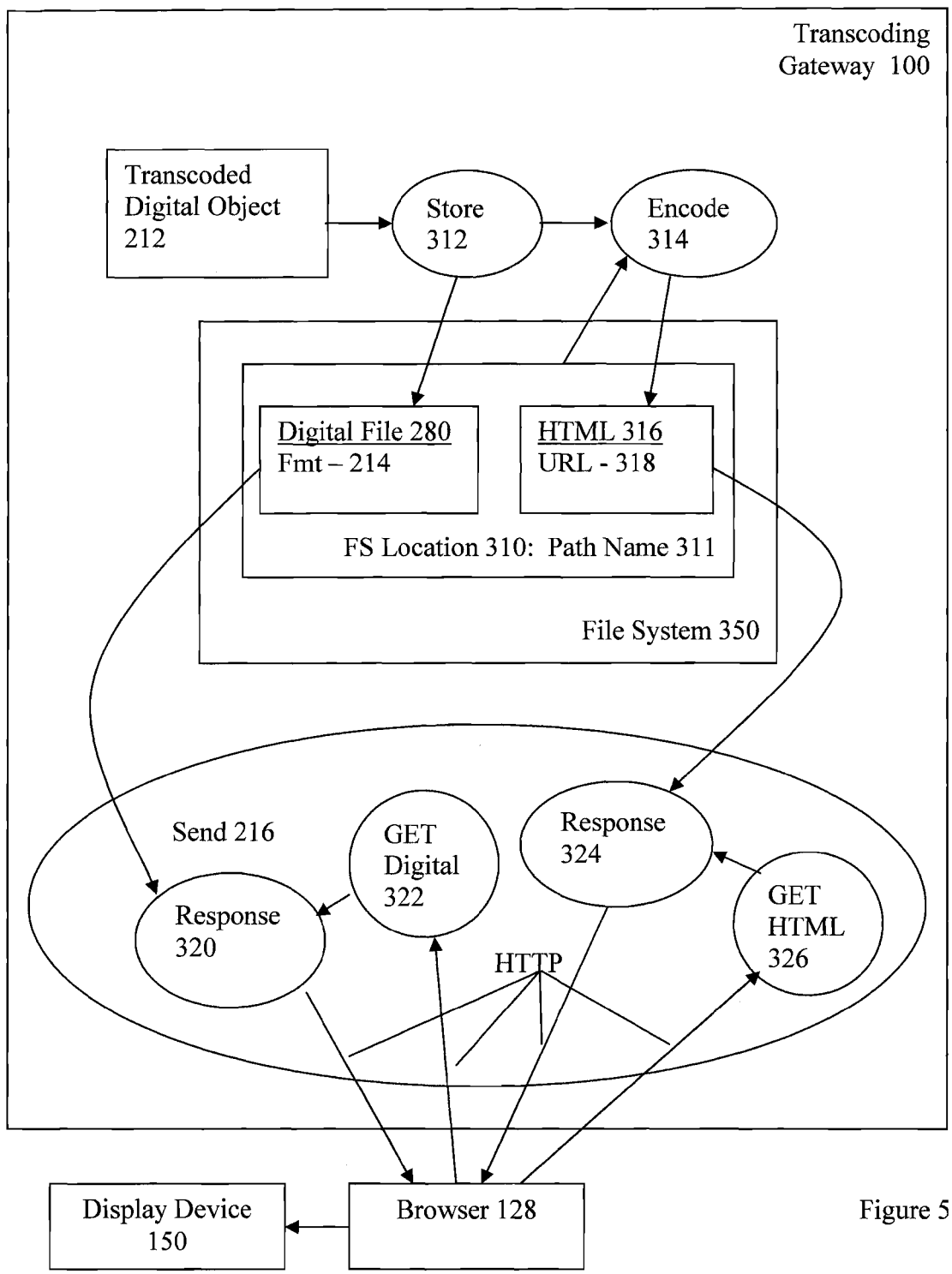
FIG. 5 is an overview data flow diagram of a still further, more detailed example embodiment of a client device comprising a transcoding gateway.

HTTP service, for example, in some embodiments is limited so as to conserve costs of development and manufacture. Turning to FIG. 5, for example, a further embodiment is illustrated including a file system (350), the file system including file system storage locations (310), each file system storage location having a path name (311). FIG. 5 shows a more detailed example embodiment in which HTTP functionality within a service gateway is included in the send function (216) for transmitting digital files to a browser (128).

In the example embodiment of FIG. 5, digital files (270) are forms of transcoded digital objects (212) stored (312) in computer memory in a file location (310) in a file system (350) included in or accessible through the transcoding gateway (100). Even more specifically, in the example embodiment of FIG. 5, the browser (128) sends an HTTP 'get' message (326) to the transcoding gateway and receives an HTTP 'response' message (324) forwarding a URL (318) encoded (314) with the file system location (310), including the path name (311), where the digital file (280) is stored. The browser uses the URL in another HTTP 'get' message (322) requesting the digital file (212) which is downloaded to the browser in a second HTTP 'response' message (320). Embodiments of this kind need only very thin HTTP service, just enough to exchange a handful of predetermined message types with a browser.

Various embodiments are operative for display devices that are audio players and the display format type 'MP3.' Many embodiments of the invention are operative for display devices that are video players and the display format type 'MPEG.' Typical embodiments of the invention are operative for display devices that are 'digital picture frames' or 'digital art frames' and the display format type 'JPEG.' Typical embodiments of the invention are operative for display devices that are 'digital picture frames' or 'digital art frames' and the display format type 'GIF.' Many other combinations of display device and display format type will occur to those of skill in the art, all such combinations being perfectly useful within the scope of the present invention.

While embodiments have been described for email comprising digital objects having the display format types JPEG, MPEG, MP3, and GIF, among others, for example, persons skilled in the art will recognize many alternative digital formats that are useful with the invention, all such digital formats being well within the scope of the invention. While embodiments of the inventions have been described generally in terms of HTTP and HTML as they are often associated with URL processing in the Web, those skilled in the art will readily appreciate that other internet protocols are known and are adaptable to the teachings of the invention. Many such adaptations will occur to those of skill in the art, all such adaptations being well within the scope of the present invention.

Figure 11:
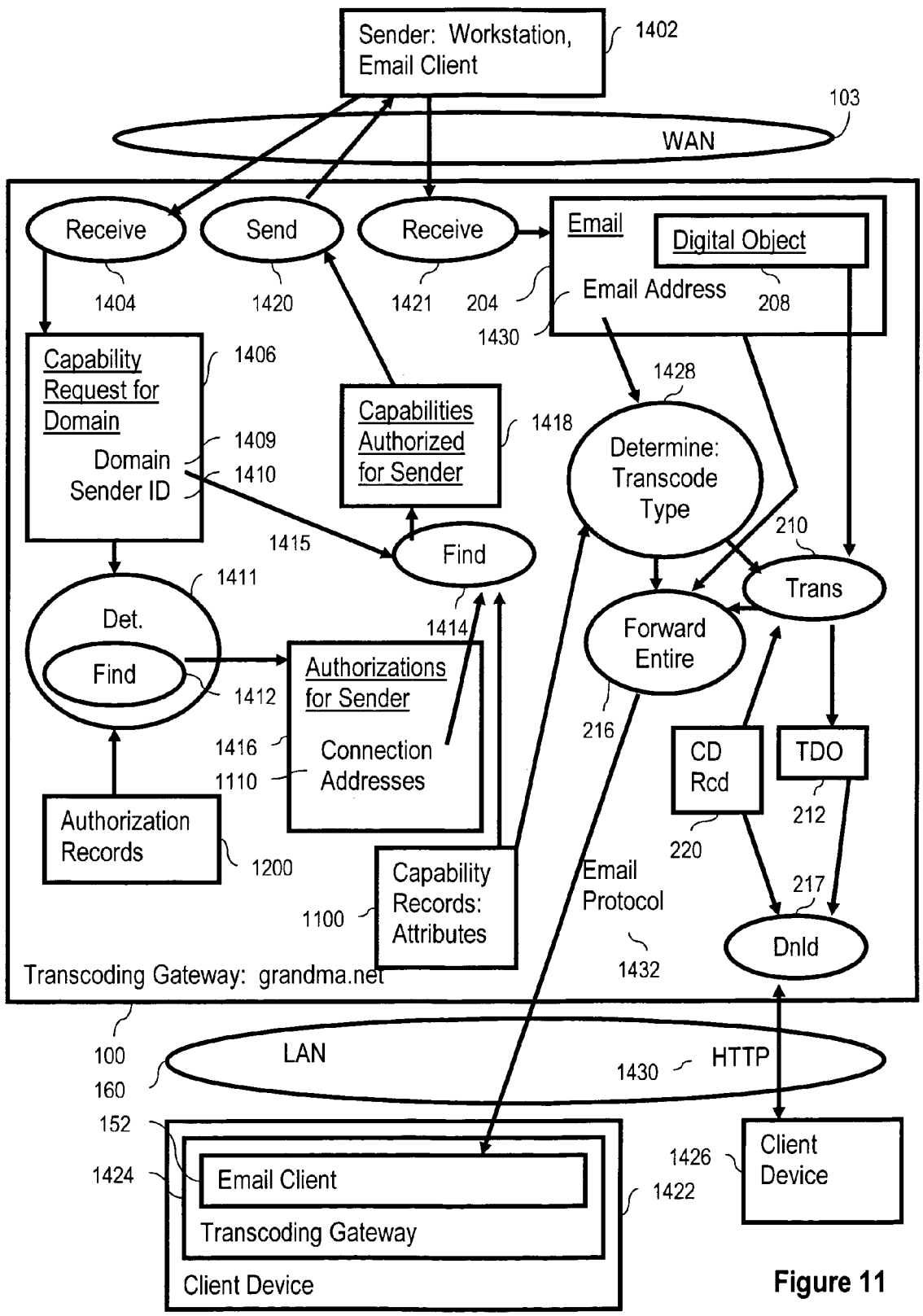
FIG. 11 illustrates exemplary embodiments capable of determining client device capabilities, communicating the client device capabilities to email senders, and determining on the basis of client device capability attributes whether to transcode a digital object in a particular transcoding gateway.

Turning now to FIG. 11, an additional exemplary embodiment is shown as a method of email administration that includes receiving (1404) in a transcoding gateway (100) from a sender (1402) an email display capability request (1406) for a domain, in which the capability request includes a domain identification (1409). As used in this specification, "domain" refers to a group of client devices administered together and identified by a common network address, typically an internet protocol address, that resolves to a domain name. FIG. 12 illustrates a number of exemplary display capability records (1100) for client devices in two domains (1106), one domain identified by the domain name 'grandma.net,' and the other identified by the domain name 'someother.net.' The display capability records for domain 'someother.net,' that is, records (1170), (1172), and (1174), are included particularly to disclose and explain that a transcoding gateway in many embodiments serves more than one domain. The domain identification (1409 on FIG. 11) in various embodiments is implemented as an internet protocol address or as a domain name. In this specification, exemplary domain identifications, for convenience of reference, are generally taken as domain names.

The example embodiment of FIG. 11 includes finding (1414), in dependence upon the domain identification (1409), at least one email display capability record (1100) for the domain, wherein the email display capability record for the domain includes display capability attributes describing an email display capability for the domain. Other example embodiments typically include sending (1420) at least one of the email display capability attributes (1418) to the sender. This illustrates embodiments making direct use of domain names (1415) without using a sender identification to find capability records. Such embodiments typically return for sending (1420) back to the sender display capability attributes for all the display capabilities for a domain.

For a capability request for the domain 'grandma.net,' as shown in FIG. 11, such an embodiment returns attributes for the ten display capability records (1150) through (1168). In many embodiments, however, it is useful to have additional limits on the number or capability records returned to the sender, especially in domains having many client devices having many display capabilities. Business, education, public, and Internet domains, for example, have very large numbers of display devices and display capabilities.

In a further example embodiment shown in FIG. 11, the email display capability request (1406) includes a sender identification (1410) identifying the sender. This further example includes determining (1411), in dependence upon the sender identification (1410), that the sender is authorized to send email to a connection address in the domain. In typical embodiments of this kind, determining (1411) that the sender is authorized to send email to a connection address in the domain includes finding (1412), in dependence upon the sender identification (1410) and in dependence upon the domain identification (1409), at least one sender authorization record (1416).

In such exemplary embodiments, the sender authorization record (1416) represents authorization for the sender to send email to a connection address in the domain, and the sender authorization record includes sender authorization attributes (as shown, for example, in FIG. 13) including a connection address (1110) in the domain. Typically in such embodiments, finding (1414) at least one email display capability record (1100) for the domain typically includes finding, in dependence upon the domain identification (1409) and in dependence upon the connection address (1110), at least one email display capability record (1100) for the domain. Embodiments of this kind return to the sender only the display attributes of display devices that the sender is authorized to address, thus sensibly limiting the sheer number of display capabilities returned to the sender from domains where there are many display devices and display capabilities.

Figure 16:
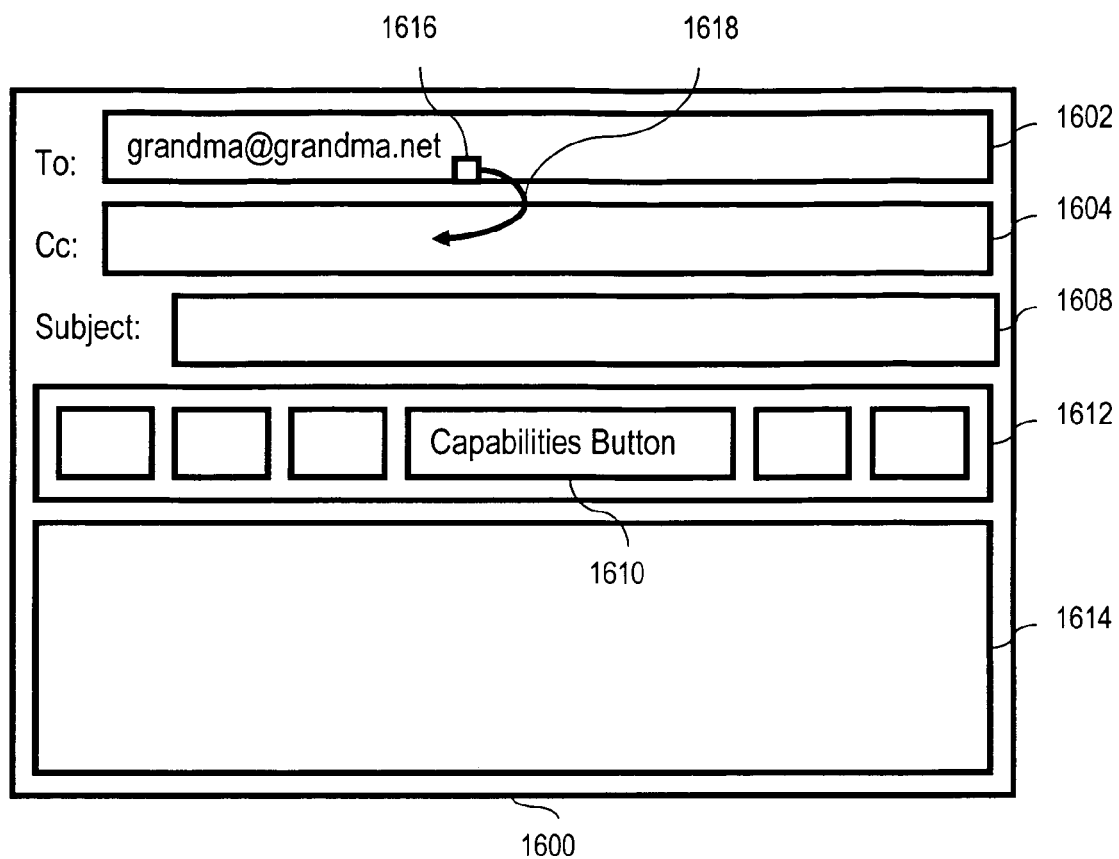
FIG. 16 shows an exemplary GUI dialogue box or data entry form of a sender's email client.

FIG. 16 illustrates the dynamic quality of embodiments according to the present invention. FIG. 16 shows a GUI dialogue box or data entry form of a sender's email client (1402 on FIG. 11) for a new email message. In the exact moment of data entry represented by FIG. 16, a sender has typed in the email address 'grandma@grandma.net' into the destination address field (1602) and tapped the TAB key on the sender's keyboard to move (1618) the data entry cursor (1616) to the Cc field (1604). The domain for the email address 'grandma@grandma.net' is 'grandma.net.' It is at this moment in typical embodiments, just as the sender taps the TAB key in the address field, the first moment when the email client has available domain name, that the email client implementing the example email client (as reference 1402 on FIG. 11) sends a capability request for domain 'grandma.net' (1406 on FIG. 11). The capability request (1406 on FIG. 11) is typically formatted as an HTTP 'request' message and the email display capability attributes (1418 on FIG. 11) returned to the sending email client are typically returned from the transcoding gateway in the form of an HTTP 'response' message.

In the particular example of FIG. 16, the email client's data entry form (1600) includes a toolbar (1612) having a capabilities button (1610) which when mouse-clicked upon caused the display of a GUI message box of the kind shown in FIG. 14. In typical embodiments, a message box of the kind shown in FIG. 14 lists for the sender's convenient reference all the capabilities available for the sender's use in the destination domain, that is, the capabilities just identified in an HTTP 'response' message in response to the sender's HTTP 'request' message requesting the display capabilities in the destination domain. In typical embodiments, the capabilities button (1610) is activated after receipt of the return HTTP 'response' message bearing the display capabilities. The function of a capabilities button (1610) makes a display of domain capabilities available at the sender's convenience. In some embodiments, the capabilities are displayed as soon as they are received, without waiting for the sender to press a capabilities button.

This discussion shows the dynamic nature of the exemplary embodiments. Many senders send many emails messages to many domains. Using embodiments of the present invention, however, there is no need to store at the senders' many locations display capabilities for many domain. Using various embodiments of the present invention, display capabilities for a destination domain for a particular email message are made quickly and dynamically available as an email message is being typed in by a sender. Also, display capabilities change from day to day or even from moment to moment in some domains. The domain display capabilities provided through use of embodiments of this invention, however, are timely, representing as they do the exact current availability of display capabilities in a domain.

A further embodiment, shown also in FIG. 11, includes receiving (1421) email (204) in a transcoding gateway (100), where the email includes an email address (1430) and at least one digital object (208). Such embodiments typically include determining (1428), in dependence upon display capability attributes (1100) and the email address (1430), whether the digital object is to be transcoded in the transcoding gateway, in which the determining results in a determination. Other example embodiments typically include forwarding the email (216), including the digital object, to the email address (1430), if the determination is that the digital object is not to be transcoded in the transcoding gateway. If the determination is that the digital object is to be transcoded in the transcoding gateway, example embodiments typically include transcoding (210) the digital object into a transcoded digital object (212), and downloading (217) the transcoded digital object to a destination client device (1422).

In a more detailed exemplary embodiment, illustrated in FIG. 11, transcoding (210) a digital object includes transcoding the digital object into a digital file having a digital format and a file name (as shown, for example, in FIG. 2). In some example embodiments, downloading (217) the transcoded digital object typically downloading the digital file to a destination client device (1426) at an internet address recorded in an internet address field (226) of a client device record (as shown, for example, at reference 220 in FIG. 3). In typical embodiments, the client device record has recorded, in a mailbox address field (222) in a client device record (220), a mailbox address identical to the email address (1430) of the email message, and recorded in a digital file format code field (224) of the client device record, a digital file format code indicating that the client device represented by the client device record is capable of receiving the digital format of the digital file.

In example embodiments of the kind illustrated in FIG. 11, determining (1428), in dependence upon display capability attributes (1100) and the email address (1430), whether the digital object is to be transcoded in the transcoding gateway, often includes finding a capability record (1100) having a connection address equal to the email address (1430). In many exemplary embodiments, forwarding (216) the email includes forwarding the entire email, including the digital object, to an email client (152) in another transcoding gateway (1424) in a client device (1422).

FIG. 12 is used for further explanation. The example display capability records (1100) in FIG. 12 have display capability attributes including a display capability identification (1102), a display capability description (1104), a domain name (1106), a connection type (1108), a connection address (1110), and a transcode type (1111). The connection type (1108) is an indication of the protocol or communications technology to be used to send an email or digital objects to client devices. The connection address (1110) is an indication of where to send email or digital objects from the transcoding gateway. The transcode type (1111) is an indication whether digital objects in email are to be transcoded in the transcoding gateway or forwarded for further processing elsewhere.

FIG. 12 shows ten example display capability records for the domain 'grandma.net' (1150–1168). Seven of the capabilities represented (1150–1162) have connection type 'Email' and transcode type 'Forward.' Email addressed to the connection addresses for such capabilities are forwarded to the connection addresses (reference 216 on FIG. 11). More specifically, for example, email addressed to 'grandma@grandma.net' is forwarded to grandma's personal computer (reference 1150 on FIG. 12.)

And email addressed to 'gm-tv@grandma.net' is forwarded to the set top box on grandma's television set (1154). The fact that grandma's television set is listed as having video and audio capabilities (1154 and 1156) means that grandma's set top box includes a transcoding gateway. More specifically, referring to FIG. 11, in the example under discussion, grandma's set top box is a client device as illustrated at reference (1422), and the set top box includes a transcoding gateway (1424) that also includes an email client (152). The email client in this case has email the address 'gm-tv@grandma.net,' and the transcoding gateway is capable of transcoding MP3 files and MPEG files from email messages and displaying, or playing, such files on grandma's television.

Similarly, display capability record (1158) shows that grandma's car has a transcoding gateway that implements a wireless email client with transcoding capability for text to speech conversion. Some embodiments of wireless email clients in transcoding gateways use Bluetooth or 802.11b, so that they can only receive their email when in range of a Bluetooth, 802.11b, HomeRF wireless access point; that is, such embodiments typically can receive their email only when they are parked in the garage or out front of the house. Other embodiments use wireless packet connections such as TDMA, GSM, CDPD, GPRS, EDGE, or UMTS; such embodiments receive their email anywhere that digital wireless service is available, on earth or in space.

Grandma's kitchen stove (1160), in the present example, includes a transcoding gateway capable of transcoding text files into recipes and downloading the recipes into a database of recipes, under microcomputer control on the stove. Grandma's PDA (1162) receives wireless email and transcodes included digital objects for the small liquid crystal display on grandma's PDA.

The three display capabilities represented by records (1164), (1166), and (1168), illustrate a second transcoding type (1111) which is used to order transcoding of a digital objects in the transcoding gateway in which the email is received, as opposed to forwarding the email without transcoding its digital objects. This second transcoding type (1111) is illustrated in FIG. 12 by the value 'Transcode Here' or 'Transcode Here & Forward,' as shown for records (1164), (1166), and (1168).

The email addresses for the transcoding capabilities represented by display capability records (1164), (1166), and (1168) are unconventional or virtual email addresses in that they do not represent final destination addresses to which email is delivered through email protocols. Email addressed to such virtual email addresses typically is transcoded, or rather its included digital objects are transcoded in the receiving transcoding gateway, and then the email is either discarded or forwarded to a corresponding conventional email address.

That is, such virtual email addresses are optionally associated through, for example, a one-to-many table relation implemented by using the virtual address as a foreign key, with corresponding conventional email addresses for forwarding An important use of virtual addresses, addresses, however is to function as an interim or virtual address for email whose included digital objects are to be transcoded in a particular transcoding gateway, that is, email directed toward a display capability whose representative display capability record has a transcode type field set to 'Transcode Here' or 'Transcode Here & Forward.'

Administration of email directed toward a display capability having transcode type of 'Transcode Here & Forward,' in many exemplary embodiments, includes finding a corresponding convention forwarding address to which to forward the email after its digital objects are transcoded in the receiving transcoding gateway. The corresponding conventional forwarding email address is an email address of any kind for any kind of email client, including, for example, ordinary personal computers running email clients or downstream client devices comprising additional transcoding gateways with embedded email clients. In many embodiments, therefore, email forwarded to a corresponding conventional email address will have its included digital object played, displayed, or viewed subsequently on some downstream client device or display device. First, however, its included digital objects are transcoded and played or displayed through the transcoding gateway having a display capability record with a transcode type of 'Transcode Here & Forward.'

FIG. 12 illustrates email administration exemplary embodiments of the present invention for display capabilities with transcode types of 'Transcode Here' or 'Transcode Here & Forward.' First, attend to capability record (1168) for audio on grandma's stereo. Record (1168) has transcode type (1111) of 'Transcode Here.' Email, addressed to gm-stereo@grandma.net, containing digital objects comprising audio files, such as, for example, MP3 files, has its included digital objects transcoded in the receiving transcoding gateway and downloaded across a LAN to and played on grandma's stereo. The connection type (1108) for grandma's stereo is 'HTTP,' indicating that grandma's stereo has, in this example, at least sufficient HTTP capability to receive a transcoded digital file and play it. The stereo's HTTP capability in various exemplary embodiments optionally includes anything up to a full blown Web browser or embedded JAVA server.

After its included digital objects are transcoded and downloaded, email addressed to grandma's stereo, in this example, is discarded. FIG. 15 illustrates relations among virtual email addresses (1504) and corresponding conventional addresses (1506). In many embodiments, a virtual address forwarding table would simply have no record for grandma's stereo, because email directed to grandma's stereo is not to be forwarded. Record (1552), for the virtual address gm-stereo@grandma.net is included for this example, however, to expressly illustrate a lack of a corresponding conventional address for grandma's stereo.

In FIG. 12, capability records (1164), (1166), and (1172) have transcode types of 'Transcode Here & Forward.' Capability records (1164) and (1166) are respectively for images and text overlays on a digital art frame ("DAF") in Grandma's living room. Email, addressed to gm-daf@grandma.net, to the extent that its included digital objects are graphic images and text overlay files, has its included digital objects transcoded and downloaded for display on grandma's digital art frame. Then such email is forwarded to a corresponding conventional email address identified, for example, by finding in a table such as the one illustrated in FIG. 15, a virtual address forwarding record (1550) for the virtual address 'gm-dat@grandma.net.' In this example, such email is forwarded to grandma's personal computer at 'grandma@grandma.net,' as shown in record (1550) in FIG. 15. Similarly, email addressed to 'y@someother.net' (record 1172 on FIG. 12) has its digital objects transcoded for playing on an audio player coupled to the transcoding gateway and then is forwarded to 'z@someother.net' as shown in record (1554) in FIG. 15.

It is clear from the foregoing descriptions that many modifications and changes may be made in the exemplary embodiments of the invention without departing from its true spirit. The descriptions in this specification are for illustration only and are not to be construed in a limiting sense. The scope of this invention is limited only by the language of the following claims.

What is claimed is:

1. A method of email administration comprising the steps of:
   receiving in a transcoding gateway from a sender an email display capability request for a domain, wherein the capability request comprises a domain identification;
   finding, in dependence upon the domain identification, at least one email display capability record for the domain, wherein the email display capability record for the domain comprises display capability attributes describing an email display capability for the domain;
   sending at least one of the email display capability attributes to the sender;
   receiving an email in a transcoding gateway, the email comprising an email address and at least one digital object;
   determining, in dependence upon display capability attributes and the email address, whether the digital object is to be transcoded in the transcoding gateway, wherein the determining results in a determination;
   forwarding the email, including the digital object, to the email address, if the determination is that the digital object is not to be transcoded in the transcoding gateway; and
   if the determination is that the digital object is to be transcoded in the transcoding gateway, carrying out the further steps of:
   transcoding the digital object into a transcoded digital object; and
   downloading the transcoded digital object to a destination client device.

2. The method of claim 1 wherein the email display capability request includes a sender identification identifying the sender, and the method further comprises determining, in dependence upon the sender identification, that the sender is authorized to send email to a connection address in the domain.

3. The method of claim 2 wherein determining that the sender is authorized to send email to a connection address in the domain further comprises finding, in dependence upon the sender identification and in dependence upon the domain identification, at least one sender authorization record, wherein:
   the sender authorization record represents authorization for the sender to send email to a connection address in the domain;
   the sender authorization record comprises sender authorization attributes including a connection address in the domain; and
   finding at least one email display capability record for the domain further comprises finding, in dependence upon the domain identification and in dependence upon the connection address, at least one email display capability record for the domain.

4. The method of claim 1 wherein:
   transcoding the digital object further comprises transcoding the digital object into a digital file having a digital format and a file name; and
   downloading the transcoded digital object further comprises downloading the digital file to a destination client device at an internet address recorded in an internet address field of a client device record, the client device record having:
   recorded in a mailbox address field in the client device record, a mailbox address identical to the email address of the email message, and,
   recorded in a digital file format code field of the client device record, a digital file format code indicating that the client device represented by the client device record is capable of receiving the digital format of the digital file.

5. The method of claim 1 wherein determining, in dependence upon display capability attributes and the email address, whether the digital object is to be transcoded in the transcoding gateway, further comprises finding a capability record having a connection address equal to the email address.

6. The method of claim 1 wherein forwarding the email further comprises forwarding the entire email, including the digital object, to an email client in another transcoding gateway in a client device.

7. A system of email administration comprising:
   means for receiving in a transcoding gateway from a sender an email display capability request for a domain, wherein the email display capability request comprises a domain identification;
   means for finding, in dependence upon the domain identification, at least one email display capability record for the domain, wherein the email display capability record for the domain comprises display capability attributes describing an email display capability for the domain;
   means for sending at least one of the email display capability attributes to the sender;
   means for receiving an email in a transcoding gateway, the email comprising an email address and at least one digital object;
   means for determining, in dependence upon display capability attributes and the email address, whether the digital object is to be transcoded in the transcoding gateway, wherein the determining results in a determination;
   means for forwarding the email, including the digital object, to the email address, if the determination is that the digital object is not to be transcoded in the transcoding gateway; and
   if the determination is that the digital object is to be transcoded in the transcoding gateway, means for carrying out the further steps of:
   means for transcoding the digital object into a transcoded digital object; and
   means for downloading the transcoded digital object to a destination client device.

8. The system of claim 7 wherein the email display capability request includes a sender identification identifying the sender, and the system further comprises means for determining, in dependence upon the sender identification, that the sender is authorized to send email to a connection address in the domain.

9. The system of claim 8 wherein means for determining that the sender is authorized to send email to a connection address in the domain further comprises means for finding, in dependence upon the sender identification and in dependence upon the domain identification, at least one sender authorization record, wherein:
  the sender authorization record represents authorization for the sender to send email to a connection address in the domain;
  the sender authorization record comprises sender authorization attributes including a connection address in the domain; and
  means for finding at least one email display capability record for the domain further comprises means for finding, in dependence upon the domain identification and in dependence upon the connection address, at least one email display capability record for the domain.

10. The system of claim 7 wherein:
  means for transcoding the digital object further comprises means for transcoding the digital object into a digital file having a digital format and a file name; and
  means for downloading the transcoded digital object further comprises means for downloading the digital file to a destination client device at an interact address recorded in an internet address field of a client device record, the client device record having:
  recorded in a mailbox address field in the client device record, a mailbox address identical to the email address of the email message, and,
  recorded in a digital file format code field of the client device record, a digital file format code indicating that the client device represented by the client device record is capable of receiving the digital format of the digital file.

11. The system of claim 7 wherein means for determining, in dependence upon display capability attributes and the email address, whether the digital object is to be transcoded in the transcoding gateway, further comprises means for finding a capability record having a connection address equal to the email address.

12. The system of claim 7 wherein means for forwarding the email further comprises means for forwarding the entire email, including the digital object, to an email client in another transcoding gateway in a client device.

13. A computer program product of email administration comprising:
  a recording medium;
  means, recorded on the recording medium, for receiving in a transcoding gateway from a sender an email display capability request for a domain, wherein the email display capability request comprises a domain identification;
  means, recorded on the recording medium, for finding, in dependence upon the domain identification, at least one email display capability record for the domain, wherein the email display capability record for the domain comprises display capability attributes describing an email display capability for the domain;
  means, recorded on the recording medium, for sending at least one of the email display capability attributes to the sender;
  means, recorded on the recording medium, for receiving an email in a transcoding gateway, the email comprising an email address and at least one digital object;
  means, recorded on the recording medium, for determining, in dependence upon display capability attributes and the email address, whether the digital object is to be transcoded in the transcoding gateway, wherein the determining results in a determination;
  means, recorded on the recording medium, for forwarding the email, including the digital object, to the email address, if the determination is that the digital object is not to be transcoded in the transcoding gateway; and
  if the determination is that the digital object is to be transcoded in the transcoding gateway, means, recorded on the recording medium, for carrying out the further steps of:
  transcoding the digital object into a transcoded digital object; and
  downloading the transcoded digital object to a destination client device.

14. The computer program product of claim 13 wherein the email display capability request includes a sender identification identifying the sender, and the computer program product further comprises means, recorded on the recording medium, for determining, in dependence upon the sender identification, that the sender is authorized to send email to a connection address in the domain.

15. The computer program product of claim 14 wherein means, recorded on the recording medium, for determining that the sender is authorized to send email to a connection address in the domain further comprises means, recorded on the recording medium, for finding, in dependence upon the sender identification and in dependence upon the domain identification, at least one sender authorization record, wherein:
  the sender authorization record represents authorization for the sender to send email to a connection address in the domain;
  the sender authorization record comprises sender authorization attributes including a connection address in the domain; and
  means, recorded on the recording medium, for finding at least one email display capability record for the domain further comprises means, recorded on the recording medium, for finding, in dependence upon the domain identification and in dependence upon the connection address, at least one email display capability record for the domain.

16. The computer program product of claim 13 wherein:
  means, recorded on the recording medium, for transcoding the digital object further comprises means, recorded on the recording medium, for transcoding the digital object into a digital file having a digital format and a file name; and
  means, recorded on the recording medium, for downloading the transcoded digital object further comprises means, recorded on the recording medium, for downloading the digital file to a destination client device at an internet address recorded in an internet address field of a client device record, the client device record having:
  recorded in a mailbox address field in the client device record, a mailbox address identical to the email address of the email message, and,
  recorded in a digital file format code field of the client device record, a digital file format code indicating that the client device represented by the client device record is capable of receiving the digital format of the digital file.

17. The computer program product of claim 13 wherein means, recorded on the recording medium, for determining, in dependence upon display capability attributes and the email address, whether the digital object is to be transcoded in the transcoding gateway, further comprises means, recorded on the recording medium, for finding a capability record having a connection address equal to the email address.

18. The computer program product of claim 13 wherein means, recorded on the recording medium, for forwarding the email further comprises means, recorded on the recording medium, for forwarding the entire email, including the digital object, to an email client in another transcoding gateway in a client device.

19. A method of email administration comprising the steps of:
    receiving in a transcoding gateway from a sender an email display capability request for a domain, wherein the email display capability request comprises a domain identification;
    finding, in dependence upon the domain identification, at least one email display capability record for the domain, wherein the email display capability record for the domain comprises display capability attributes describing an email display capability for the domain;
    sending at least one of the email display capability attributes to the sender;
    receiving an email in a transcoding gateway, the email comprising an email address and at least one digital object;
    determining, in dependence upon display capability attributes and the email address, whether the digital object is to be transcoded in the transcoding gateway;
    forwarding the email, including the digital object, to the email address, if the digital object is not to be transcoded in the transcoding gateway; and
    if the digital object is to be transcoded in the transcoding gateway, transcoding the digital object into a transcoded digital object and downloading the transcoded digital object to a destination client device.

20. The method of claim 19 wherein:
    transcoding the digital object further comprises transcoding the digital object into a digital file having a digital format and a file name; and
    downloading the transcoded digital object further comprises downloading the digital file to a destination client device at an internet address recorded in an internet address field of a client device record, the client device record having:
    recorded in a mailbox address field in the client device record, a mailbox address identical to the email address of the email message, and,
    recorded in a digital file format code field of the client device record, a digital file format code indicating that the client device represented by the client device record is capable of receiving the digital format of the digital file.

21. The method of claim 19 wherein determining, in dependence upon display capability attributes and the email address, whether the digital object is to be transcoded in the transcoding gateway, further comprises finding a capability record having a connection address equal to the email address.

* * * * *